Nov. 5, 1957 O. GARAPOLO ET AL 2,811,974
DIPPING MACHINE
Filed May 9, 1950 7 Sheets-Sheet 1

Inventors,
Orlando Garapolo
and Jerry P. Petitti
By: Schneider & Dressler, Attys.

Nov. 5, 1957  O. GARAPOLO ET AL  2,811,974
DIPPING MACHINE

Filed May 9, 1950  7 Sheets-Sheet 2

Inventors:
Orlando Garapolo
and Jerry P. Petitti
By: Schneider & Dressler, Attys.

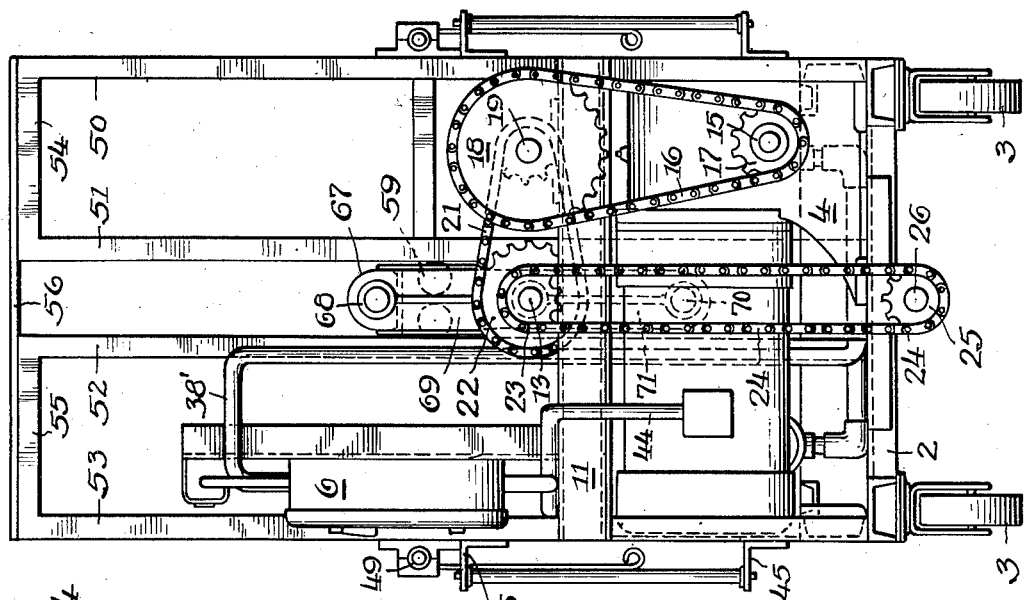
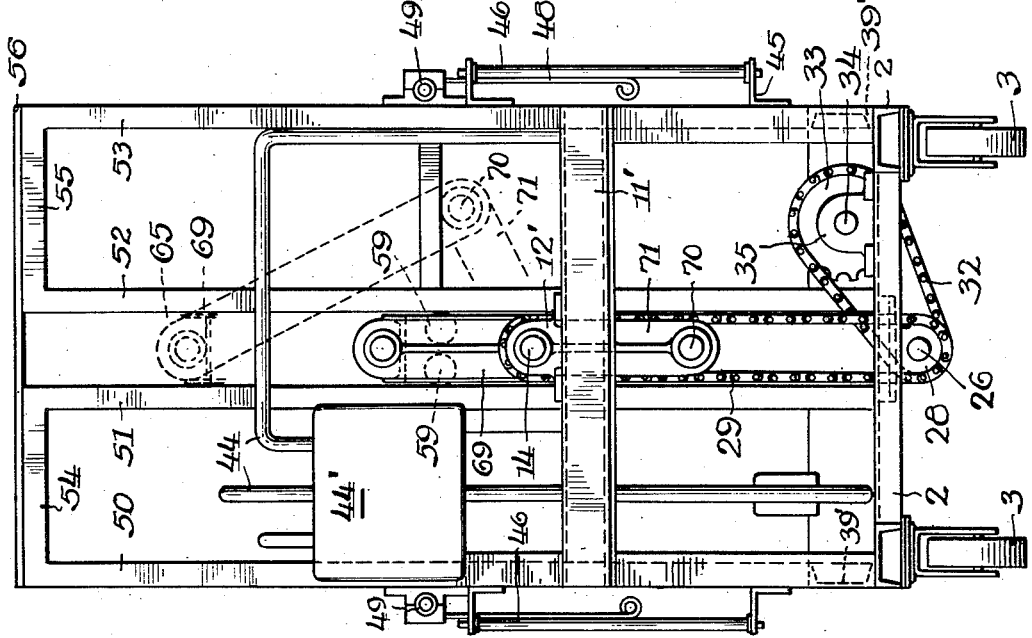

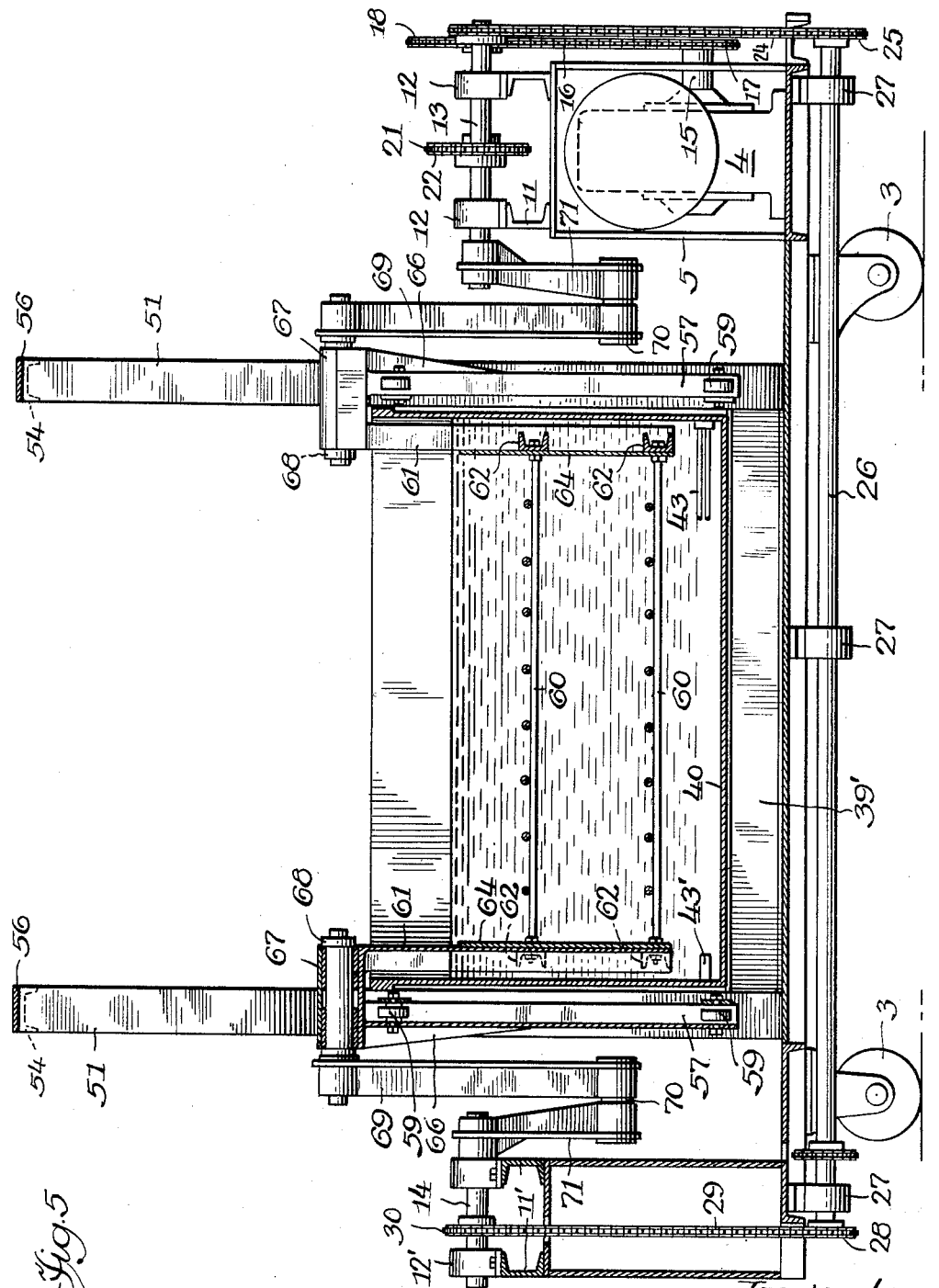

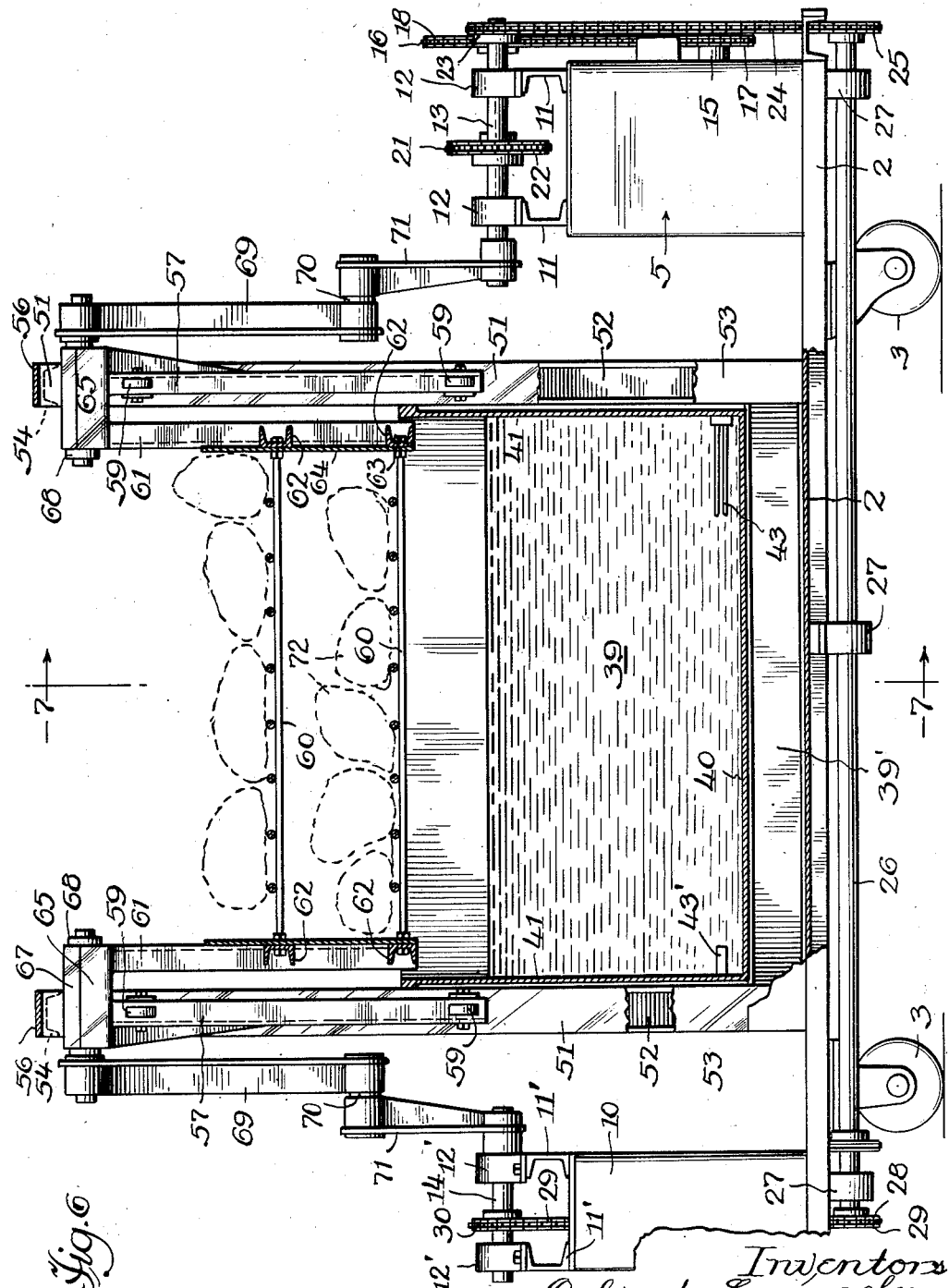

Nov. 5, 1957  O. GARAPOLO ET AL  2,811,974
DIPPING MACHINE
Filed May 9, 1950  7 Sheets-Sheet 6
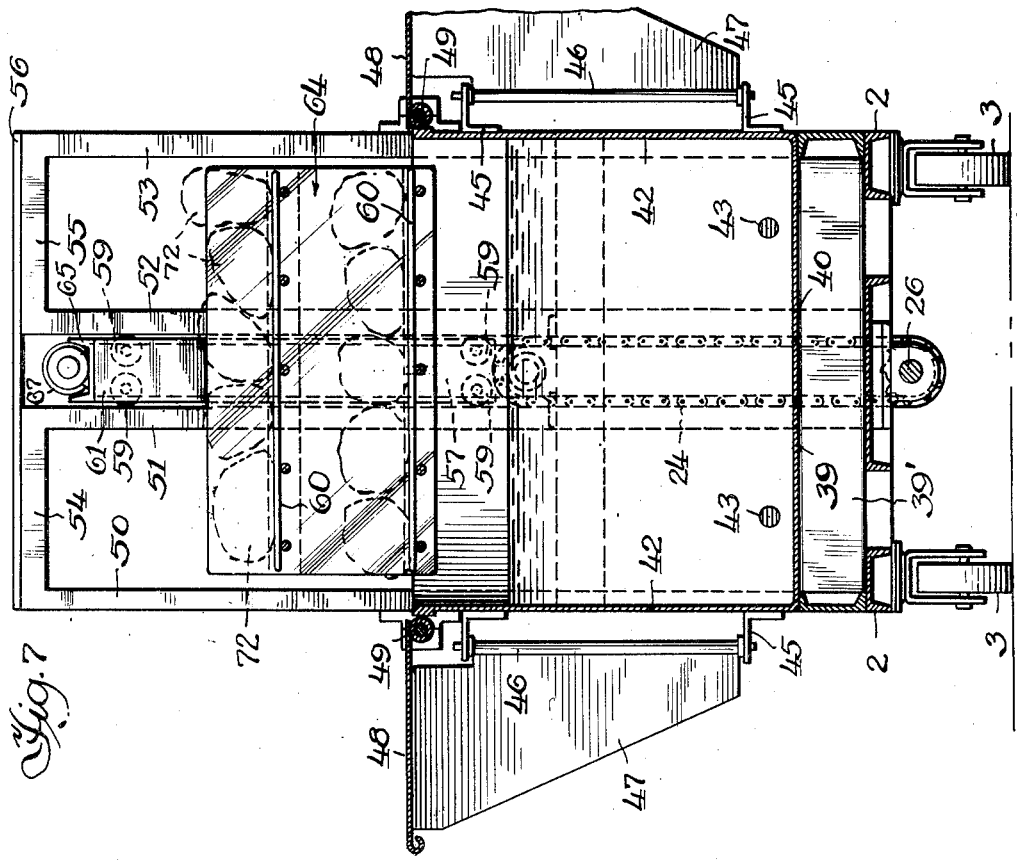
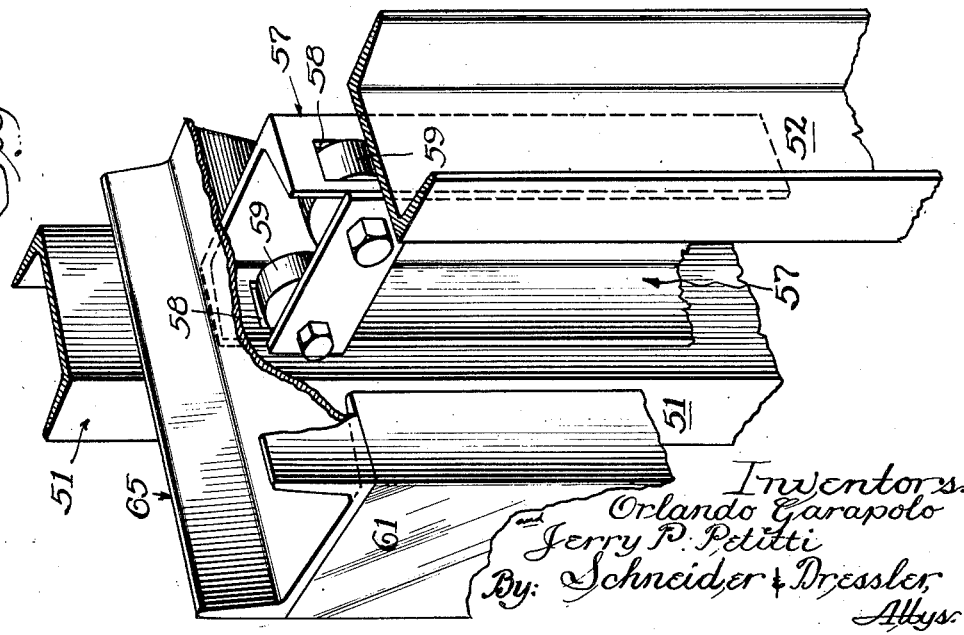
Inventors.
Orlando Garapolo
Jerry P. Petitti
By: Schneider & Dressler
Attys.

Nov. 5, 1957     O. GARAPOLO ET AL     2,811,974
DIPPING MACHINE
Filed May 9, 1950     7 Sheets-Sheet 7
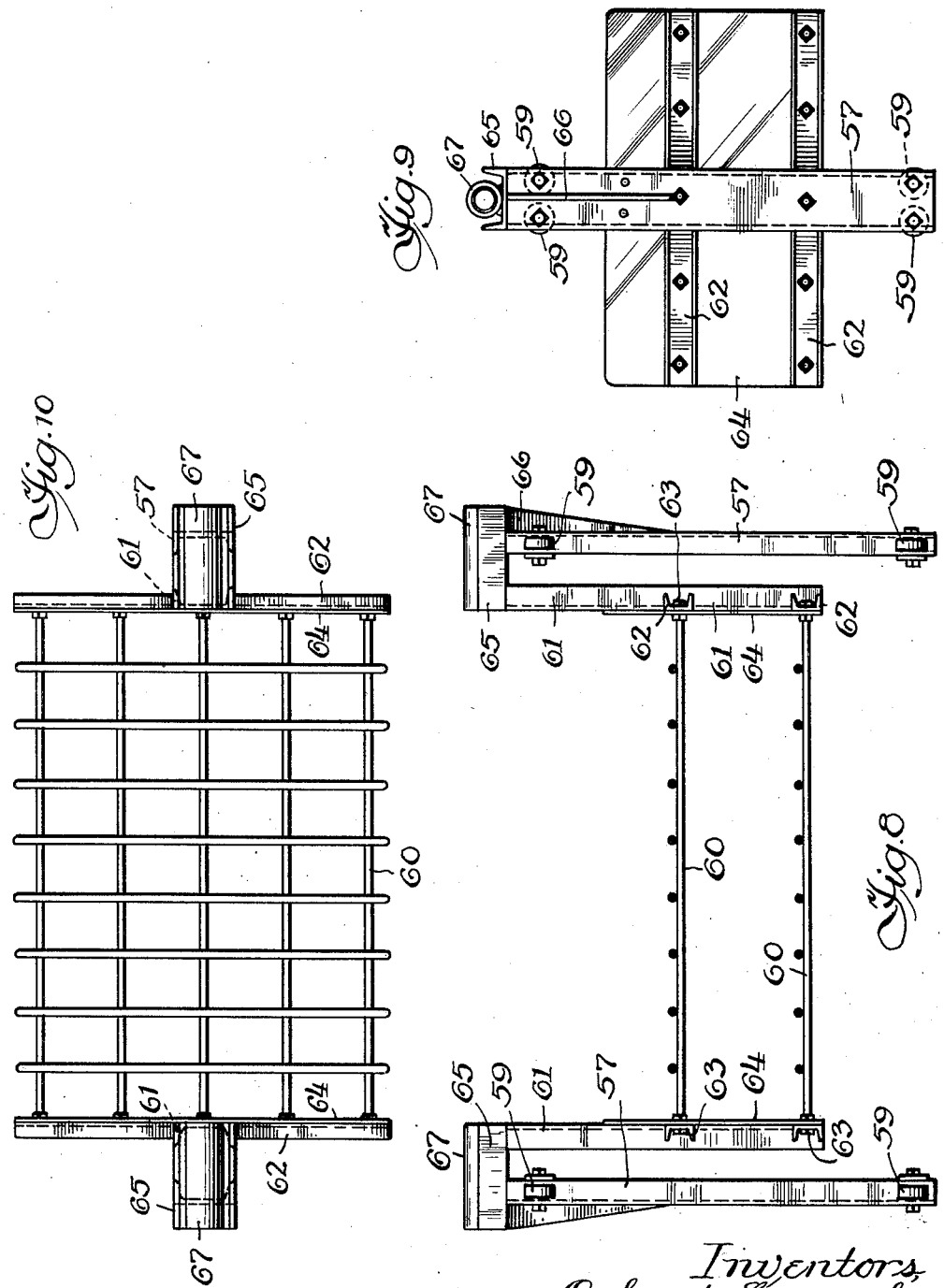
Inventors,
Orlando Garapolo
and Jerry P. Petitti
By: Schneider & Dressler, Attys.

United States Patent Office 2,811,974
Patented Nov. 5, 1957

2,811,974

DIPPING MACHINE

Orlando Garapolo and Jerry P. Petitti, Chicago, Ill., assignors to Wilson & Co., Inc., a corporation of Delaware Application May 9, 1950, Serial No. 161,001

4 Claims. (Cl. 134—58)

This invention relates to a dipping machine and has particular reference to a machine for dipping hams and pork bellies into water and removing them into a freezing atmosphere to provide a surface glaze of ice about the hams and pork bellies to protect the same against freezer burnes during storage, and dehydration.

Although the detailed description of the dipping machine of the present invention will be made with particular reference to a process of dipping meat to protect it from freezer burns, it will be understood that the dipping machine has general utility and may be used to make potato chips, doughnuts, shrimp, or other foods of similar nature that are cooked or fried before they are sold to the consumer, by dipping the uncooked or unfried product in hot deep fat. The dipping machine may also be used to dip chickens or other fowl into hot water to facilitate removal of their feathers. It will be obvious that the timing interval of the dipping machine may be regulated to provide different immersion periods for different products.

Hams and pork bellies are frequently held in storage at about 0° to 5° F. before they are processed for human consumption. When taken from storage and permitted to thaw to room temperature, such hams and bellies frequently show freezer burns. These freezer burns show as discolored areas which must be cut away before the meat can be sold. This, obviously, is wasteful of the material, time-consuming and costly. In order to prevent the formation of freezer burns and the objectionable costs incident thereto, meats, such as hams and pork bellies, have been surface-glazed with a coating of ice before being placed in storage.

The surface glaze has been successful as a preventative for freezer burns, but the methods of forming the surface glaze were not satisfactory for various reasons. For example, if the water was sprayed on the meat, portions of the meat in contact with the structure on which the meat was supported were not coated. Another disadvantage was that often the meats would be stuck together and could not be separated. All of the dipping operations previously known caused the water to splash and form ice on the floor. This ice constitutes a very dangerous hazard to the workmen and slows production considerably.

The dipping machine embodying the present invention is portable, compact, and simple in design and operation. It permits quick, easy dipping of large quantities of hams or pork bellies in a single operation without any splashing of the water. The machine is electrically controlled so that after a double dipping operation the circuit is automatically broken, and may be started again only by the manual operation of a starting switch. If desired, the machine may be adjusted so as to stop automatically after a single dipping operation, or after any predetermined number of dipping operations.

The dipping tank contains immersion heaters to keep the water just above freezing. When the dipping operation is completed the meats are removed and the ice glaze is formed immediately because the temperature of the meat product and the temperature of the room in which the dipping tank is located is well below freezing. As soon as one load of meats is emptied from the dipping machine another load is placed therein, and the manual switch is thrown to start another dipping operation.

Other advantages of applicants' dipping machine will be apparent from a reading of the following description, taken in conjunction with the accompanying drawings showing a preferred illustrative embodiment of the invention, in which:

Fig. 3 is an end elevation of the dipping machine, taken from the left hand side of Fig. 1;

Fig. 4 is an end elevation taken from the right hand side of Fig. 1;

Fig. 5 is a cross sectional view, taken generally along the line 5—5 of Fig. 2;

Fig. 6 is a view similar to Fig. 5, with the dipping trays in elevated position;

Fig. 7 is a cross sectional view, taken along the line 7—7 of Fig. 6;

Fig. 8 is a side view, partly in section and partly in elevation, of the dipping tray structure;

Fig. 9 is an end elevation of the tray structure;

Fig. 10 is a top elevation of the tray structure; and

Fig. 11 is a greatly enlarged fragmentary perspective detail view of the tray supporting structure.

Figure 1:
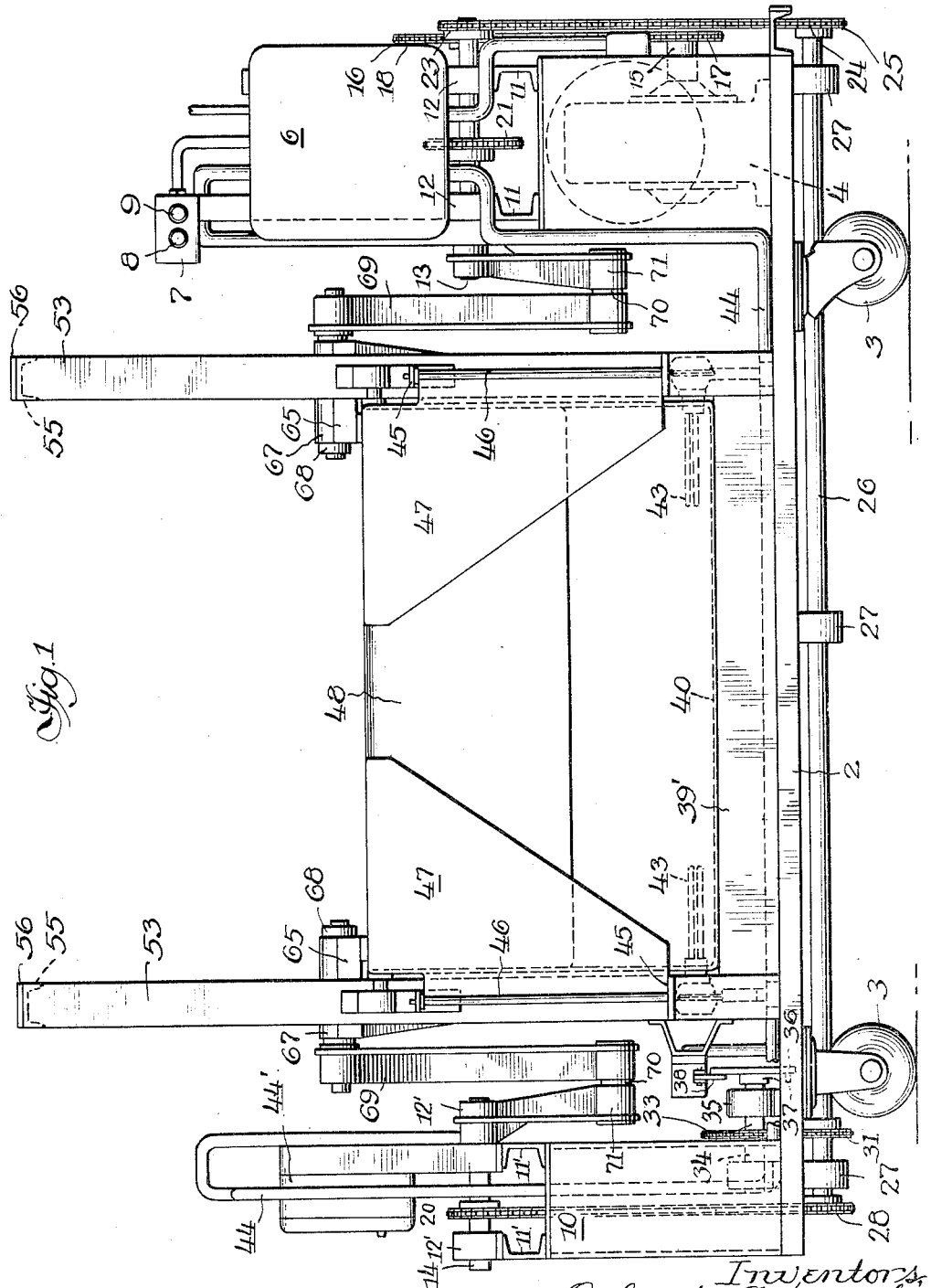
Figure 1 is a side elevation of the dipping machine embodying the invention.

In the drawings, the reference numeral 2 indicates a frame having a plurality of casters 3 mounted thereon. The frame preferably comprises a plurality of longitudinal channel irons and a plurality of transverse channel irons secured together at their ends in any suitable manner. The casters are preferably freely swiveled so that the dipping machine which is supported on the frame may be easily moved from one place to another in the cold room in which the dipping operation takes place. The mobility of the machine reduces the labor necessary to glaze a roomful of meats because the distance each load of meats must be carried is kept to a minimum by moving the machine close to the particular meat that is to be glazed. A motor 4, suitably a gear head brake motor, is mounted on frame 2 adjacent one end and is enclosed by a housing 5. A housing 6 containing electrical controls is mounted above housing 5, and a switch 7 is suitably mounted adjacent housing 6. The switch includes a starter button 8 which must be operated manually to energize the circuit, and a manually operated button 9 which may be used to break the circuit and stop the motor. The motor is stopped by means of button 9 only in emergencies, because the circuit contains a trip switch, as hereinafter described, which is operated automatically to break the circuit when the moving parts reach a predetermined position after the starting button has been operated manually to close the circuit. The specific structure of the switch is conventional and forms no part of the present invention.

A support 10, of about the same height as housing 5, is mounted on frame 2 adjacent the end opposite the end on which housing 5 is mounted. A pair of channel irons 11 mounted on housing 5 support bearings 12 in which a shaft 13 is rotatably mounted. At the opposite end of the frame a similar shaft 14 is rotatably mounted in bearings 12' supported on channel irons 11' carried by support 10. Shafts 13 and 14 are in axial alignment. A shaft 15 is driven by motor 4 through a series of reduction gears (not shown) and in turn drives a chain 16 which fits around a sprocket 17 rigidly mounted on shaft 15 and around another sprocket 18. The sprocket 18 drives a shaft 19 on which it is rigidly mounted. Shaft 19 drives a sprocket 20 which is rigidly mounted thereon. Shaft 19 is rotatably supported in bearings 19' mounted on channel irons 11. A chain 21 fitting around sprocket 20 is driven thereby, and in turn drives a sprocket 22 rigidly secured to shaft 13 at an intermediate point.

A sprocket 23 rigidly mounted adjacent the end of shaft 13 drives a chain 24 which fits around a sprocket 25 beneath sprocket 23 and drives a shaft 26 upon which sprocket 25 is rigidly mounted at one end. The shaft 26 extends longitudinally of the machine and is supported by a plurality of bearings 27 depending from frame 2. A sprocket 28, rigidly mounted on the other end of shaft 26, drives a chain 29 which extends around a sprocket 30 rigidly mounted on shaft 14 to drive shaft 14 simultaneously with shaft 13 at the same rate of rotation. Another sprocket 31, rigidly mounted on shaft 26 drives a chain 32 which extends around a sprocket 33. Sprocket 33 is rigidly mounted on a shaft 34 rotatably supported in bearings 35. Bearings 35 are mounted on frame 2. The ratio between sprockets 31 and 33 may be varied, as desired, but in the illustrations is 1 to 2 so that shaft 34 completes one rotation for every two rotations of shaft 26. Sprockes 23, 25, 28 and 30 all have the same diameter so that shafts 13 and 14 rotate at the same rate as shaft 26, that is, twice for every rotation of shaft 34.

Figure 2:
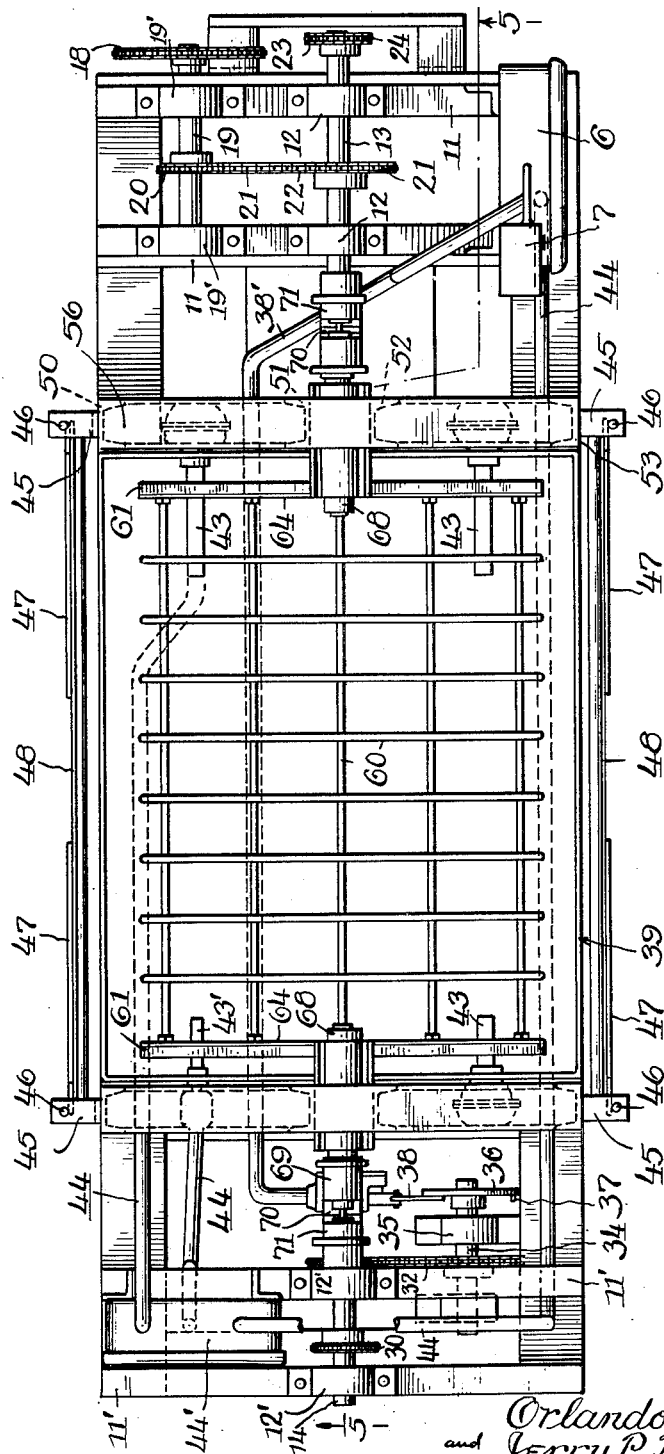
Fig. 2 is a top elevation of the dipping machine shown in Fig. 1.

A disk 36 (Fig. 2), rigidly mounted on shaft 34, has a pin 37 projecting from one side. The pin engages a trip switch 38 (of conventional structure) every time shaft 34 completes a revolution. Each tripping of switch 38 breaks the circuit which energizes motor 4. The circuit remains open until it is closed by manual operation of starting switch 8. The wiring for trip switch 38 is carried from housing 6 through a conduit 38' running under the bottom of the tank. The trip switch is automatically reset so that pin 37 may again break the circuit upon the next engagement with trip switch 38 which takes place on one revolution of shaft 34 or two revolutions of shafts 13 and 14 after the starting switch is operated. The ratio of rotations of shafts 13 and 14 to shaft 34 may be increased by replacing sprocket 33 with a sprocket of larger diameter. Such replacement increases the number of dips of the dipping tray, as hereinafter described, before the machine is stopped by the tripping of switch 38. If it is desired to have the tray dipped only once and then stop the machine, this may be done by replacing sprocket 33 with a sprocket of the same diameter as sprocket 28, or by providing disk 36 with another pin 37 diametrically opposite the pin 37 shown in the drawings so that switch 38 is tripped twice for each revolution of sprocket 33.

If the machine is to be used for some purpose other than glazing frozen meats so that it is desirable to stop motor 4 while the tray, hereinafter described, is immersed in the dipping tank, this may be accomplished by positioning the pin or pins 37 in different angular positions relative to the diameter of disk 36 upon which the pin 37 shown in the drawings is positioned.

A dipping tank 39 is mounted on a plurality of channel irons 39' mounted on frame 2 between housing 5 and support 10. The dipping tank comprises a bottom 40, end walls 41 and side walls 42. The tank is provided with a plurality of immersion heaters 43 and a thermostat 43' to maintain the water in the tank just above freezing. The heaters are necessary because the room in which the dipping machine is used is maintained at a temperature of from about zero to 5° F. The wiring for the thermostat and immersion heaters is carried in conduits 44 leading to a housing 44'.

A pair of vertically aligned brackets 45 is secured to each side wall 42 adjacent its ends. The brackets are each apertured and a rod 46 is pivotally mounted in each pair of brackets. A supporting web 47 is secured to each rod 46. A longitudinally extending plate 48 is pivotally mounted on each side wall 42 adjacent its top edge, as shown at 49 (Fig. 7). When the dipping machine is to be used, webs 47 may be swung outwardly more than 90° so that plates 48 may be swung upwardly at approximately right angles to side walls 42, and then webs 47 may be swung inwardly to position under plates 48 to form supports for the plates so that the plates may be used as shelves to support meats being loaded or unloaded from the dipping tray. It is not desirable to have plates 48 fixed permanently in extended position because the extra width may interfere with the mobility of the unit.

Standards 50, 51, 52 and 53 are fixed adjacent opposite ends of frame 2 so as to project above tank 39 a distance approximately equal to the height of the tank. The arrangement of the standards at each end of the frame is the same, so only one end of the structure will be described in detail. Each of the standards comprises a channel iron with its web extending at right angles to the end wall of the tank. The flanges of standards 50 and 51 face each other, and the flanges of standards 52 and 53 also face each other. A channel iron 54 ties the upper ends of standards 50 and 51 together, and a similar channel iron 55 ties the upper ends of standards 52 and 53 together. Additional rigidity is obtained by securing a plate 56 across the tops of channel irons 54 and 55.

A channel iron 57 is mounted in upright position between the webs of standards 51 and 52 (Fig. 11). The flanges of channel iron 57 are cut out adjacent the top and bottom edges, as indicated at 58, and a roller 59 is rotatably mounted adjacent each cut out with a portion of its periphery projecting through the cut out to engage the rear surfaces of the webs of standards 51 and 52 so that channel iron 57 may be moved vertically and carry therewith the dipping tray.

The dipping tray comprises a pair of horizontal grid members 60 positioned one above the other and secured at opposite ends to supporting members 61 in any suitable manner. As shown in Figs. 5, 6, 8 and 9, the longitudinal wires of the grid member extend through channel irons 62 and are secured in place by nuts 63. Channel irons 62 are rigidly secured to support 61 by welding or in any other suitable manner. A plate 64, secured to channel irons 62, closes the ends of the dipping tray and adds rigidity to the structure. The grid members preferably comprise wide mesh wire members, as shown in Fig. 10, but may be perforated plates or any similar structure. It is essential that they have sufficient strength to support a plurality of meats, such as hams, which are to be dipped, and that their surface area in contact with the meats be relatively small so that the meat can be covered over its entire surface with the ice glaze formed when the dipping tray is lifted from the water into the freezing atmosphere of the room in which the dipping machine is operated. The number of grid members may be varied, depending upon the depth of the tank, and the height of the objects to be dipped.

Each supporting member 61 is rigidly secured at its upper edge to a channel 65 which extends across the top of channel iron 57 and is welded thereto. A reinforcing web 66 is welded to the upper portion of channel iron 57 and the web of channel iron 65 to provide additional rigidity for channel iron 65. A sleeve 67 is welded on top of channel iron 65. Sleeve 67 serves as a bearing for a stud 68 which is rotatably secured in one end of a lever arm 69. The opposite end of arm 69 is rotatably mounted on a stud 70 which is rotatably mounted in one end of a crank arm 71. The opposite end of crank arm 71 is rigidly secured to either shaft 13 or 14, depending on which end of the machine it is positioned.

The dipping operation may be summarized as follows. The meats 72, or other objects to be dipped, are loaded on the grids 60 with their edges spaced from each other when the grids are positioned in their uppermost position and the motor is not running. The temperature of the room is from about zero to 5° F. but the water in the dipping tank is heated by the immersion heaters to a temperature slightly above freezing. Starter button 8 is pressed to close the electrical circuit, and motor 4 rotates shafts 13 and 14. Shafts 13 and 14 rotate crank arms 71 in synchronization thereby moving lever arms 69 to their lowermost position and dipping the tray into the water of the dipping tank. Continued rotation of shafts 13 and 14 raise arms 69 to lift the tray from the water. As soon as the meats are lifted out of the water the frozen meats and/or the cold air freeze the water clinging thereto in a thin glaze of ice, thereby encasing the meats in ice. The immersion time is sufficient to wet the entire surface of each piece of meat without thawing it. This movement takes place upon one complete revolution of shafts 13 and 14 and continues until the tray has been dipped into the water a second time and lifted up again. At this stage of the process the disk 36 has completed one revolution, and pin 37 trips switch 38 to break the circuit and stop motor 4.

The hams or pork bellies are then removed from the tray, and the frozen meats and/or the cold air again freeze the water clinging thereto to form a heavier glaze of ice which entirely encases each ham or pork belly. After the tray has been reloaded with unglazed hams or pork bellies, the button 8 is again pressed to start another double dipping operation. In case of any trouble, such as the failure of switch 38 to function properly, the machine may be stopped at any time by pressing the button 9. The vertical movement of the tray is smooth in both directions so that the water is not splashed from the tank at any time during the operation of the machine.

Although we have described a preferred embodiment of the invention in considerable detail with particular reference to its use in encasing meats with a thin glaze of ice, it will be understood that the machine is not limited to such use. The description is intended to be illustrative, rather than restrictive, as many details may be modified or changed without departing from the spirit or scope of the invention. Accordingly, we do not desire to be restricted to the exact structure disclosed.

We claim:

1. A dipping machine comprising a tank, vertically movable supporting members adjacent opposite ends of said tank, a tray secured to said supporting members said tray being below the normal liquid level of said tank when said supporting members are in their lowermost position, a motor adjacent one end of said tank, a pair of axially aligned shafts at opposite ends of said tank, both of said shafts being rotated in synchronization by said motor, a crank arm secured to each of said shafts, said tray being operatively connected at each end to said crank arms, the vertical movement of said crank arms exceeding the distance between the lowermost position of said tray and the normal liquid level of the tank, whereby said tray is dipped into and lifted from said tank by rotation of said crank arms, and a switch operable automatically to stop said motor when said tray is lifted from said tank a predetermined number of times.

2. A mobile lipping machine comprising a frame supported on rotatable casters, a tank mounted on said frame, a motor mounted on said frame adjacent one end of said tank, a pair of upright standards adjacent each end of said tank, a supporting member confined between each of said pair of standards, a tray supported at its opposite ends by said supporting members in vertical alignment with said tank, said tray being movable vertically from a position below the normal liquid level of said tank to a position above said normal liquid level, said tray being operatively connected to said motor, said motor being operable to dip said tray into said tank and to lift it therefrom by continuous operation of said motor, and a switch operable automatically to stop said motor when said tray has been lifted from said tank a predetermined number of times.

3. A dipping machine comprising a tank, vertically movable supporting members adjacent opposite ends of said tank, a sleeve rigidly secured transversely to the top edge of each of said supporting members, a tray rigidly secured at opposite ends to the lower portion of each of said supporting members in vertical alignment with said tank, the lower portions of said supporting members being positioned below the normal liquid level of said tank when in their lowermost position, and above said normal liquid level when in their uppermost position, a motor adjacent one end of said tank, a pair of axially aligned shafts at opposite ends of said tank, both of said shafts being rotated in synchronization by said motor, a crank arm secured to each of said shafts, a stud rotatably mounted in the free end of each of said crank arms, another pair of arms each having one end rotatably mounted on one of said studs, the opposite ends of said last mentioned arms being each rotatably mounted in one of said sleeves, whereby continuous operation of said motor vertically reciprocates said supporting members to dip said tray into said tank and lift it a predetermined distance above said tank, and a switch operable automatically to stop said motor when said tray is lifted out of said tank a predetermined number of times.

4. A dipping machine comprising a frame, a tank supported on said frame, a motor mounted on said frame adjacent one end of said tank, a pair of upright standards adjacent each end of said tank, a supporting member movable vertically between each of said pair of standards, a tray supported at its opposite ends by said supporting members, said tray being positioned below the normal liquid level of said tank when said supporting members are in their lowermost positions, a drive mechanism connecting each of said supporting members to said motor whereby said tray is moved vertically within predetermined limits from said lowermost position to an uppermost position above said tank, a disk rotated by said drive mechanism, a trip switch operable to stop said motor, and a pin projecting from said disk, said pin tripping said switch once during every revolution of said disk to stop said motor when said tray is lifted out of said tank a predetermined number of times.

References Cited in the file of this patent

UNITED STATES PATENTS

| | | |
|---|---|---|
| 2,167,185 | Preston | July 25, 1939 |
| 2,195,123 | Pabst | Mar. 26, 1940 |
| 2,329,472 | Koonz | Sept. 14, 1943 |
| 2,342,598 | Ozouf | Feb. 22, 1944 |
| 2,374,452 | Noyes | Apr. 24, 1945 |
| 2,432,290 | Davis | Dec. 9, 1947 |
| 2,454,286 | Lerner | Nov. 23, 1948 |
| 2,501,672 | Gerin | Mar. 28, 1950 |
| 2,538,865 | Dyson | Jan. 23, 1951 |
| 2,585,194 | Wagner | Feb. 12, 1952 |